US007385733B2

(12) United States Patent
Sunaga

(10) Patent No.: US 7,385,733 B2
(45) Date of Patent: Jun. 10, 2008

(54) IMAGING OPTICAL SYSTEM AND IMAGE READING APPARATUS USING THE SAME

(75) Inventor: Toshihiro Sunaga, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1063 days.

(21) Appl. No.: 10/616,327

(22) Filed: Jul. 8, 2003

(65) Prior Publication Data

US 2004/0105132 A1 Jun. 3, 2004

(30) Foreign Application Priority Data

Jul. 11, 2002 (JP) ............................ 2002-202359

(51) Int. Cl.
*H04N 1/40* (2006.01)
*H04N 1/04* (2006.01)

(52) U.S. Cl. ........................ 358/471; 358/474; 358/475; 358/481

(58) Field of Classification Search ................. 358/471, 358/474, 475, 481; 359/631
See application file for complete search history.

(56) References Cited

U.S. PATENT DOCUMENTS

| | | | | |
|---|---|---|---|---|
| 5,999,311 | A | 12/1999 | Nanba et al. | |
| 6,128,137 | A | 10/2000 | Togino | |
| 6,208,474 | B1 | 3/2001 | Kondo | |
| 6,313,942 | B1 | 11/2001 | Nanba et al. | |
| 6,459,530 | B2 | 10/2002 | Nanba et al. | |
| 6,510,006 | B1 | 1/2003 | Togino | |
| 6,522,475 | B2 | 2/2003 | Akiyama et al. | |
| 6,833,904 | B1 * | 12/2004 | Komatsuda | 355/67 |
| 2002/0041453 | A1 * | 4/2002 | Sekita et al. | 359/857 |
| 2002/0093636 | A1 * | 7/2002 | Komatsuda | 355/67 |

FOREIGN PATENT DOCUMENTS

| | | |
|---|---|---|
| EP | 0 790 513 | 2/1997 |
| EP | 0790513 | 8/1997 |
| JP | 08-292371 | 11/1996 |
| JP | 08-292372 | 11/1996 |
| JP | 09-5650 | 1/1997 |
| JP | 2000-134413 | 5/2000 |
| JP | 2000-171714 | 6/2000 |
| JP | 2000171714 | 6/2000 |

* cited by examiner

*Primary Examiner*—Houshang Safaipour
(74) *Attorney, Agent, or Firm*—Morgan & Finnegan, LLP

(57) ABSTRACT

To obtain an original reading imaging optical system, with which a carriage integral type scanning system can be readily realized in an original reading system such as a digital copier for which high-speed performance and high resolution are required, and an image reading apparatus using the same. According to the present invention, by crossing optical paths in a reflection optical system, the more compact imaging optical system capable of coping with decentering error can be attained. Further, by crossing the optical paths on an object side from a diaphragm, the still more compact imaging optical system can be attained. As a result, the original reading imaging optical system of the carriage integral type scanning system and the image reading apparatus using the same can be provided.

12 Claims, 12 Drawing Sheets

Y SECTION
X SECTION
Y SECTION
X SECTION
0.0500
-0.0500
FIELD ANGLE 3
FIELD ANGLE 6
FIELD ANGLE 2
FIELD ANGLE 5
FIELD ANGLE 1
FIELD ANGLE 4

Y SECTION
X SECTION
FIELD ANGLE 6
FIELD ANGLE 5
FIELD ANGLE 4
FIELD ANGLE 3
FIELD ANGLE 2
FIELD ANGLE 1
0.0500
-0.0500

IMAGING OPTICAL SYSTEM AND IMAGE READING APPARATUS USING THE SAME

BACKGROUND OF THE INVENTION

1. Field of the Invention

The present invention relates to an imaging optical system and an image reading apparatus using the same. The present invention is particularly preferable in reading information on an image such as a monochrome image or a color image by using a line sensor of an image scanner, a digital copier, a facsimile, or the like, which uses a compact imaging optical element having various aberrations corrected in a well-balanced manner with high resolution.

2. Related Background Art

Up to now, a flat-bed type image scanner has been known as an image reading apparatus (image scanner) for reading image information on an original surface.

The conventional flat-bed type image scanner has read the image information in such a way that an imaging lens and a line sensor are fixed therein to move only a reflection mirror, thereby subjecting the original surface to slit exposure scanning.

On the contrary, in recent years, a carriage integral type scanning system has often been employed, which integrates a mirror, an imaging lens, a line sensor, and the like in order to simplify an apparatus structure, and scans an original surface.

FIG. 15 is a schematic diagram showing a main part of a conventional image reading apparatus of a carriage integral type scanning system. In the figure, light flux irradiated from an illumination light source L directly illuminates an original O placed onto an original table glass CG, an optical path of the reflected light flux from the original O is bent inside a carriage C via a first reflection mirror M1, a second reflection mirror M2, and a third reflection mirror M3 in order, and the light flux is imaged on a surface of a line sensor LS by an imaging lens (imaging optical system) 4. Then, the carriage C is moved in a direction of an arrow A (sub-scanning direction) shown in FIG. 15 by a sub-scanning motor B, so that the image information of the original O is read. The line sensor LS of FIG. 15 is constituted by arranging plural light receiving elements in a one-dimensional direction (main scanning direction).

FIG. 16 is an explanatory view showing a basic structure of the image reading optical system of FIG. 15.

In the figure, reference numeral 4 denotes an imaging optical system; IR, IG, and IB, line sensors for reading image information of colors R (red), G (green), and B (blue), respectively; and OR, OG, and OB, reading ranges on an original surface corresponding to the line sensors IR, IG, and IB, respectively. The carriage C scans the stationary original surface in the image reading apparatus shown in FIG. 15. Here, the scanning of the carriage C is equivalent to movement of the original surface O with respect to the stationary line sensor LS and the imaging lens 4 as shown in FIG. 16. By scanning the original surface O, an identical part can be read by the line sensors of different colors at a certain time interval. At this time, as shown in FIG. 15, in the case where the imaging lens 4 is composed of an ordinary refraction system, an axial chromatic aberration and a chromatic aberration of magnification occur. Thus, defocus or positional deviation take place in line images to be formed on the line sensors IB and IR as compared with the reference line sensor IG. Therefore, when the respective color images are superimposed to reproduce an object to be scanned, color bleeding or deviation is conspicuous in a resulting image. That is, there arises a problem in that requirements cannot be met regarding performances of a high aperture ratio and a high resolution.

On the other hand, recently, it has been clarified that, even in a decentered optical system, it is possible to establish an optical system in which aberrations are corrected sufficiently by introducing the concept of a reference axis to make constituent surfaces thereof asymmetry and aspherical. For example, a designing method for such an optical system is disclosed in JP 09-5650 A and design examples thereof are disclosed in JP 08-292371 A and JP 08-292372 A. Further, disclosed in U.S. Pat. No. 6,522,475 B, U.S. Pat. No. 5,999,311 B, U.S. Pat. No. 6,313,942 B, and U.S. Pat. No. 6,459,530 B are magnification optical systems using the above optical system.

FIG. 14 is a sectional view partially showing a main part of a reflection optical system as disclosed in JP 08-292371 A. In FIG. 14, the reflected light flux from the object passes through the diaphragm and enters a reflection optical element B1. In the reflection optical element B1, the light flux is refracted at a surface R1, reflected by surfaces R2, R3, R4, R5, and R6, and then refracted at a surface R7 and emitted from the reflection optical element B1. In the optical path, the light flux is primarily imaged on an intermediate image plane around the second surface, thereby forming a pupil around the fifth surface. Then, the light flux emitted from the reflection optical element B1 is finally imaged on an image pickup surface (image pickup surface of an image pickup medium such as CCD).

In the structure of FIG. 14, the optical element having the plural curved reflection surfaces and flat reflection surfaces integrated therein is used, thereby downsizing the entire mirror optical system. At the same time, the reflection mirrors are arranged with high precision irrespective of the mirror optical system.

Also, the diaphragm is arranged closest to the object side in the optical system and an object image is formed at least once in the optical system. Therefore, regardless of the reflection type optical element with a wide field angle, an effective diameter of the optical element can be reduced. The plural reflection surfaces constituting the optical element are applied with an appropriate refractive power and arranged in a decentering manner. As a result, the optical path in the optical system is bent into a desired shape and the whole length of the optical system in a predetermined direction can be shortened.

Such a decentered optical system is called an off-axial optical system. The off-axial optical system includes an off-axial curved surface as a curved surface, in which when the axis extending along reference light beam passing through an image center and a center of the pupil is assumed as a reference axis, a surface normal line of an optical surface constituting the optical path at a crossing point with the reference axis is not on the reference axis. In the off-axial optical system, the reference axis has a folded configuration at each off-axial curved surface. With the off-axial optical system, since constituent surfaces thereof are generally decentered and eclipse never occurs even on the reflection surface, it is easy to establish an optical system using the reflection surface.

On the other hand, when the reflection surfaces constitute the optical system, the decentering error is generally easy to occur. Thus, if the reflection surfaces are used to constitute the optical system, each reflection surface should be maintained with precision. Further, as another conceivable problem, in the case where the curvature radius of the reflection surface is small and the curvature is large, the decentering error is likely to occur. Also, the larger the distance between the surfaces after the reflection, the larger the positional deviation of the light beam due to the error of the surface inclination.

An original reading system such as a digital copier is difficult to constitute by the integral type optical system because a high resolution and high-speed performance are required therefor. Since an imaging lens required in the reading system needs to be bright and have a high resolution, it is difficult to increase a field angle in order to assure an optical performance. If the field angle is small, such a problem that the resultant optical path length increases is caused.

Further, in the case where a color image is read, as the resolution of the imaging lens becomes higher, the optical performance is more affected by a difference of imaging positions for the respective colors due to the chromatic aberration or by a chromatic aberration such as color drift in a screen. Therefore, the optical system is required, which can reduce the occurrences of the chromatic aberration.

SUMMARY OF THE INVENTION

The present invention has been made in view of the above-mentioned problems, and it is an object of the present invention to provide an original reading imaging optical system, with which a carriage integral type scanning system can be readily realized in an original reading system such as a digital copier for which high-speed performance and a high resolution are required, and an image reading apparatus using the same.

Also, another object of the present invention is to provide an original reading imaging optical system free of a chromatic aberration, with which a carriage integral type scanning system can be readily realized by use of a reflection optical system composed of reflection surfaces in reading a digital color image, and an image reading apparatus using the same.

Further, another object of the present invention is to provide a reflection optical system capable of coping with a decentering error and a positional deviation by setting a curvature of each surface and a distance between the surfaces to desired values.

According to the present invention, in the reflection optical system, by crossing the optical paths, the more compact imaging optical system is attained, which can cope with the decentering error. Further, by crossing the optical paths on an object side as viewed from a diaphragm, the still more compact imaging optical system can be attained. Therefore, it is possible to provide an original reading imaging optical system of a carriage integral type scanning system and an image reading apparatus using the same.

Also, according to the present invention, the reflection optical system composed of reflection surfaces is used, which makes it possible to attain an original reading imaging optical system free of chromatic aberration, with which a carriage integral type scanning system can be readily realized, and an image reading apparatus using the same.

Further, by setting a curvature of each surface and a distance between the surfaces to predetermined values, a reflection optical system can be achieved, which hardly causes a decentering error and a positional deviation.

DETAILED DESCRIPTION OF THE PREFERRED EMBODIMENTS

Figure 13:
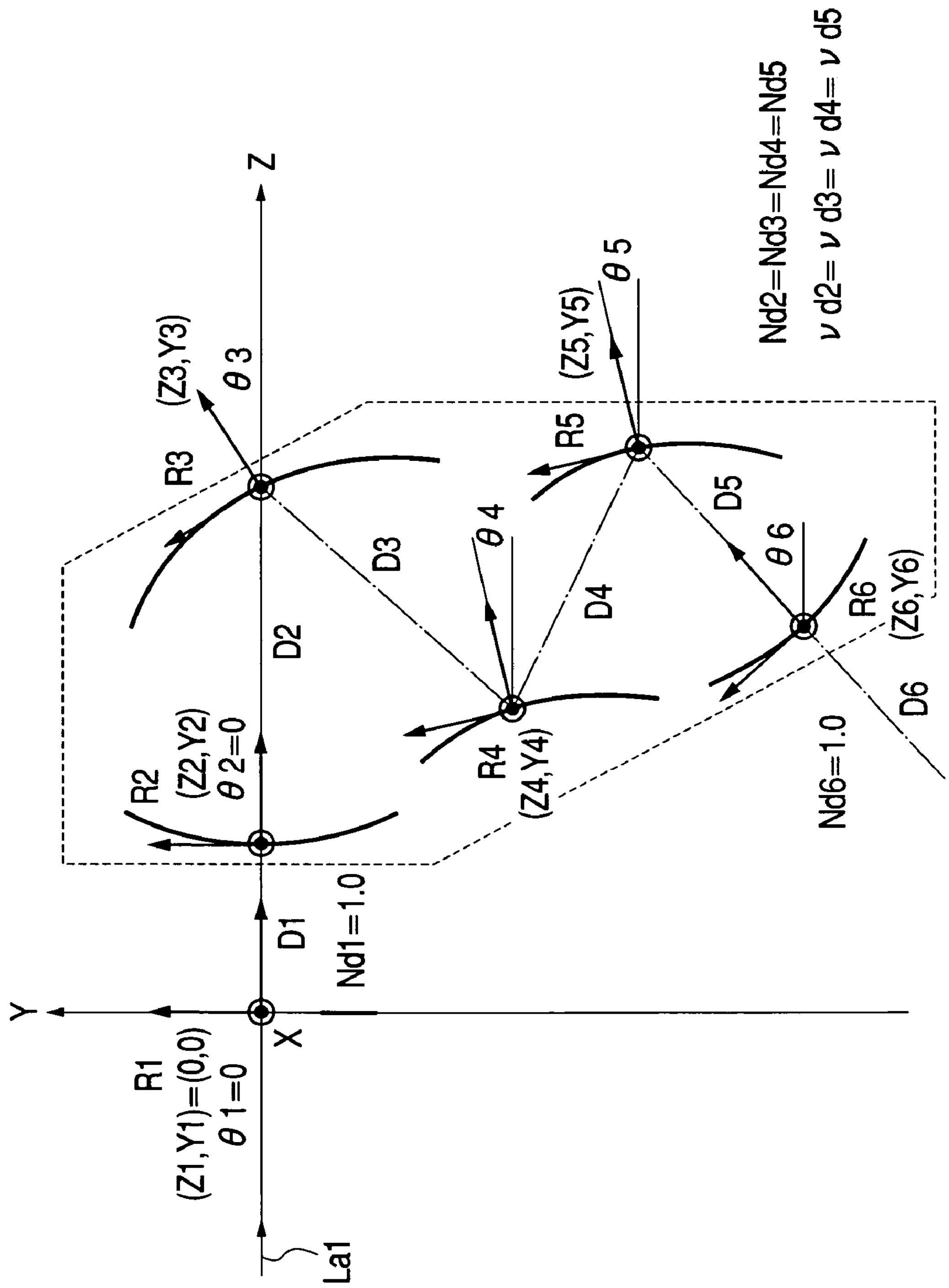
FIG. 13 illustrates a coordinate system in accordance with the respective embodiments of the present invention.
Figure 14:
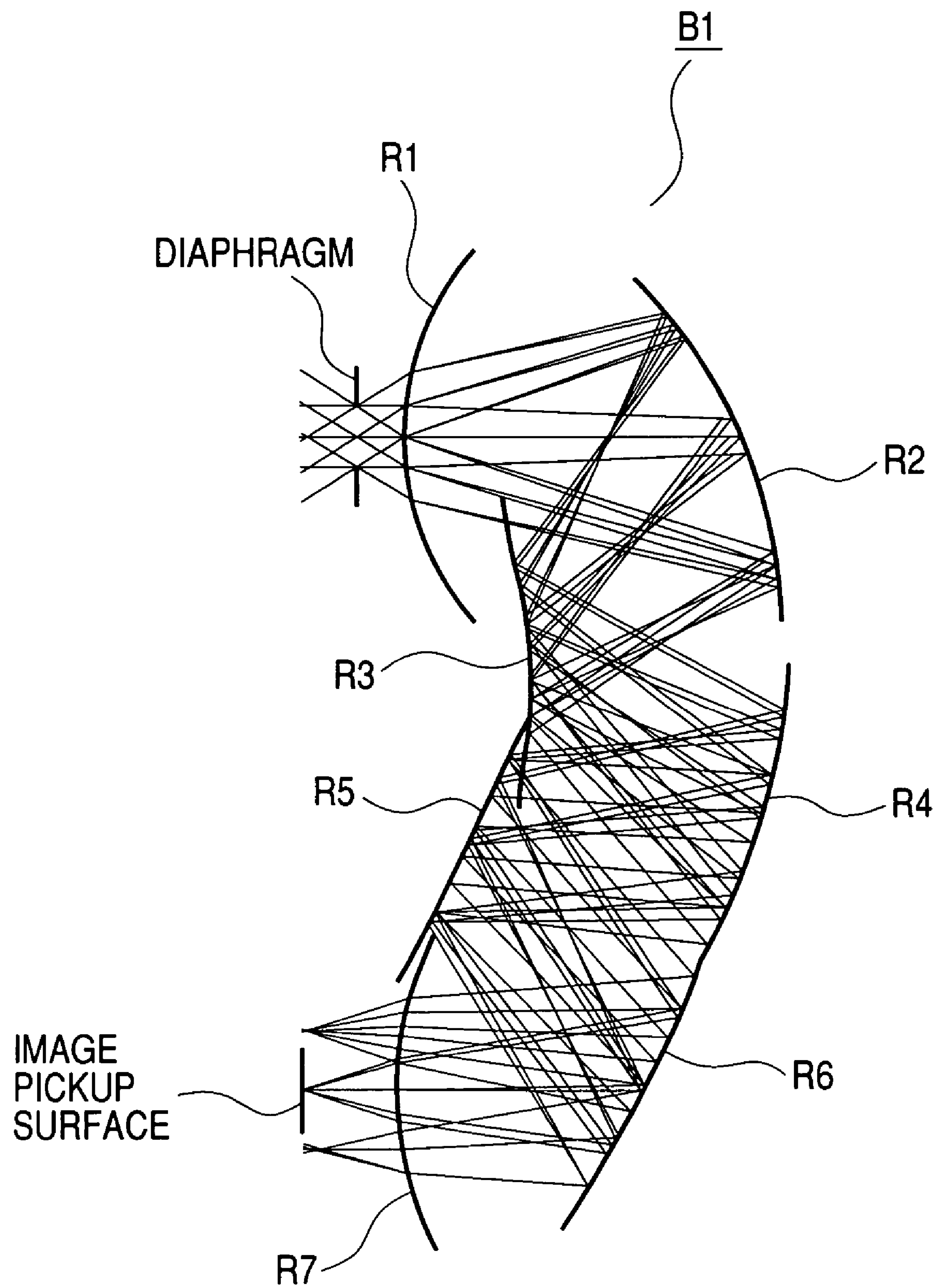
FIG. 14 shows an optical section in a YZ surface of a conventional reflection optical system.
Figure 15:
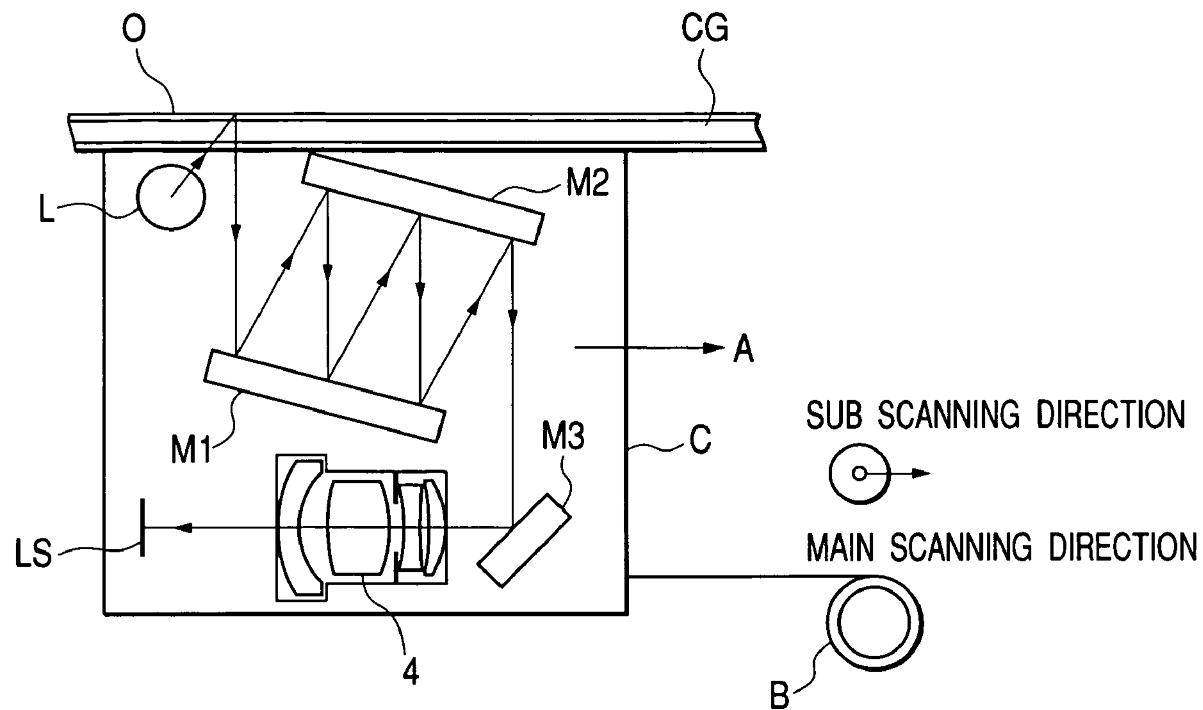
FIG. 15 is a schematic diagram showing an arrangement example of a conventional carriage integral type scanning optical system.

Hereinafter, a description will be made of how to represent various components of an optical system used in each embodiment and of common elements through all the embodiments. FIG. 13 illustrates a coordinate system adapted to define constituent data of the optical system of the present invention. In the embodiments, defined as an i-th surface is a surface in an i-th position as viewed along a light beam La1 extending from an object side to an image plane (indicated by the alternate long and short dashed line of FIG. 13 and called a reference axis light beam). In FIG. 13, a first surface R1 denotes a diaphragm; a second surface R2, a refraction surface coaxial with the first surface; a third surface R3, a reflection surface tilted relative to the second surface R2; a fourth surface R4 and a fifth surface R5, reflection surfaces shifted from each other and tilted forward; and a sixth surface R6, a refraction surface shifted and tilted relative to the fifth surface R5. The respective surfaces from the second surface R2 to the sixth surface R6 are constituted on one optical element formed of a transparent medium such as glass or plastics.

Accordingly, in the structure of FIG. 13, the medium from an object surface (not shown) to the second surface R2 is an air; a medium from the second surface R2 to the sixth surface R6 is a certain common medium; and a medium from the sixth surface R6 to an unillustrated seventh surface R7 (e.g., image plane) is the air.

The optical system of the present invention serves as an off-axial optical system, so that the respective surfaces constituting the optical system have no common optical axis. Therefore, in the embodiments, an absolute coordinate system is set by using as the origin a center of a light beam effective diameter of the first surface. In the embodiments, the light beam passing through the origin and a center of a final image plane is defined as a reference axis light beam. A route of the reference axis light beam is defined as a reference axis of the optical system. Further, in the embodiments, the direction in which the reference axis light beam travels at the time of imaging is defined as a direction of the reference axis (orientation). Also, the surfaces are numbered in the order of refraction/reflection of the reference axis light beam.

Also, each axis in the absolute coordinate system is defined as follows. Note that all the tilt surfaces constituting the optical system in each embodiment are basically assumed to be tilted in the same surface.

Z axis: Reference axis passing through the origin and extending toward the second surface R2

Y axis: Straight line passing through the origin and crossing the Z axis at 90° in the counterclockwise direction in the tilt surface (paper surface of FIG. 13)

X axis: Straight line passing through the origin and extending perpendicular to each of the Z axis and the Y axis (straight line perpendicular to the paper surface of FIG. 13)

In the embodiment of the present invention, the reference axis used as a reference in the optical axis and each axis in the absolute coordinate system are set in the aforementioned manner. Here, upon determining which axis serves as a reference in the optical system, any appropriate axis may be adopted while taking into consideration optical design, aberration control, or representation of the shape of each surface constituting the optical system.

Also, when the surface shape of the i-th surface constituting the optical system is represented, the following method can define the surface shape more easily than the method of representing the surface shape in the absolute coordinate system. That is, the local coordinate system is set, in which the origin is set as the intersection between the reference axis and the i-th surface to thereby represent the surface shape using the local coordinate system.

Therefore, in the embodiment of the present invention, the surface shape of the i-th surface is represented by the local coordinate system defined as follows. As described above, all the tile surfaces constituting the optical system in the embodiments of the present invention are basically assumed to be tilted in the same surface. As a result, in the embodiment of the present invention, the origin of the local coordinate system of each surface is on the YZ surface in FIG. 13.

In addition, a tilt angle within the YZ surface of the i-th surface is represented by an angle θi (unit: °) with an angle in a counterclockwise direction with respect to the Z axis of the absolute coordinate system set as a positive angle. Note that in the embodiment of the present invention, no decentered surface in the XZ and XY surfaces is used. Based on the above, the respective axes of the local coordinates (x, y, z) of the i-th surface are defined as follows.

z axis: Straight line passing through the origin of the local coordinate system and forming the angle θi in the counterclockwise direction within the YZ surface with respect to the Z direction of the absolute coordinate system y axis: Straight line passing through the origin of the local coordinate system and forming an angle of 90° in the counterclockwise direction within the YZ surface with respect to the z direction x axis: Straight line passing through the origin of the local coordinate system and extending perpendicular to the YZ surface In addition, Di represents a scalar corresponding to an interval between the origins of the local coordinate systems of an i-th surface and an (i+1)th surface, and Ndi and vdi represent a refractive index of a medium between the i-th surface and the (i+1)th surface and Abbe number thereof, respectively. In the embodiment of the present invention, the sectional view and numerical data of the optical system are provided on the basis of the above definition.

Note that a spherical surface has a shape represented by the following expression:

$$z=\frac{(x^2+y^2)/Ri}{1+\{1-(x^2+y^2)/Ri^2\}^{1/2}}$$

$$z=\frac{(x^2+y^2)/Ri}{1+\{1-(x^2+y^2)/Ri^2\}^{1/2}}$$

Further, the optical system according to each embodiment of the present invention includes one or more aspherical surfaces with a rotationally asymmetrical shape, typically, three or more such surfaces. The shape of each aspherical surface is represented by the following expression.

$$Z=C_{02}Y^2+C_{20}X^2+C_{03}Y^3+C_{21}X^2Y+C_{04}Y^4+C_{22}X^2Y^2+C_{40}X^4+C_{05}Y^5+C_{23}X^2Y^3+C_{41}X^4Y+C_{06}Y^6+C_{24}X^2Y^4+C_{42}X^4Y^2+C_{60}X^6$$

Since the above-mentioned curved surface expression has only an even number order term concerning x, a curved surface specified by the above-mentioned curved surface expression has a surface symmetrical shape with the yz surface as a symmetrical surface. Moreover, in the case where the following relations are satisfied, the yz surface takes a shape symmetrical with respect to the xz surface.

$$C_{03}=C_{21}=t=0$$

Further, the rotationally symmetrical shape is obtained provided that the following relations are satisfied:

$$C_{02}=C_{20}$$

$$C_{04}=C_{40}=C_{22}/2$$

$$C_{06}=C_{60}=C_{24}/3=C_{42}/3$$

If the above relations are not satisfied, the curved surfaces do not take the rotationally symmetrical shape.

Figure 3:
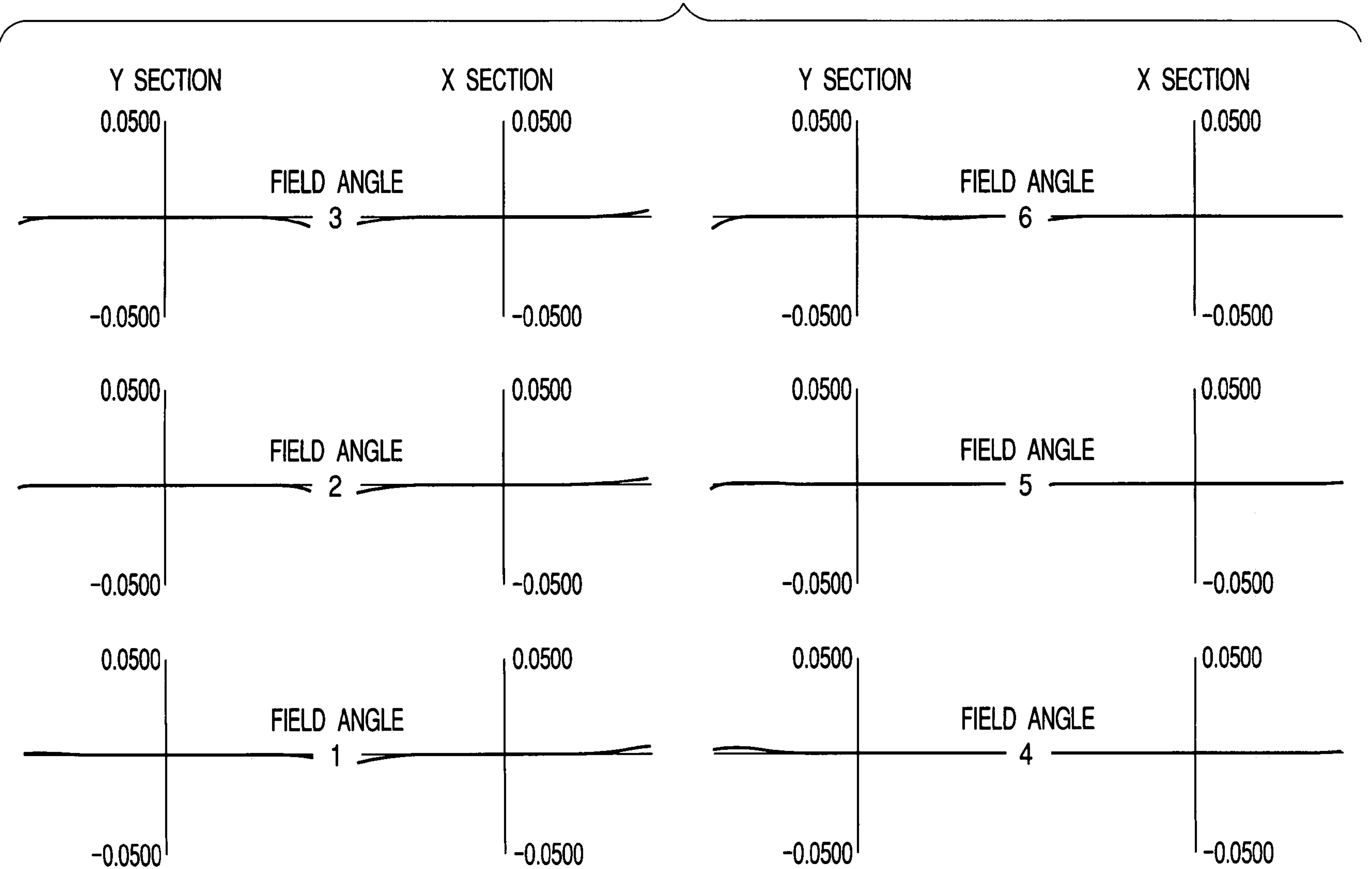
FIG. 3 is a lateral aberration chart of an optical system in accordance with the first embodiment of the present invention.
Figure 7:
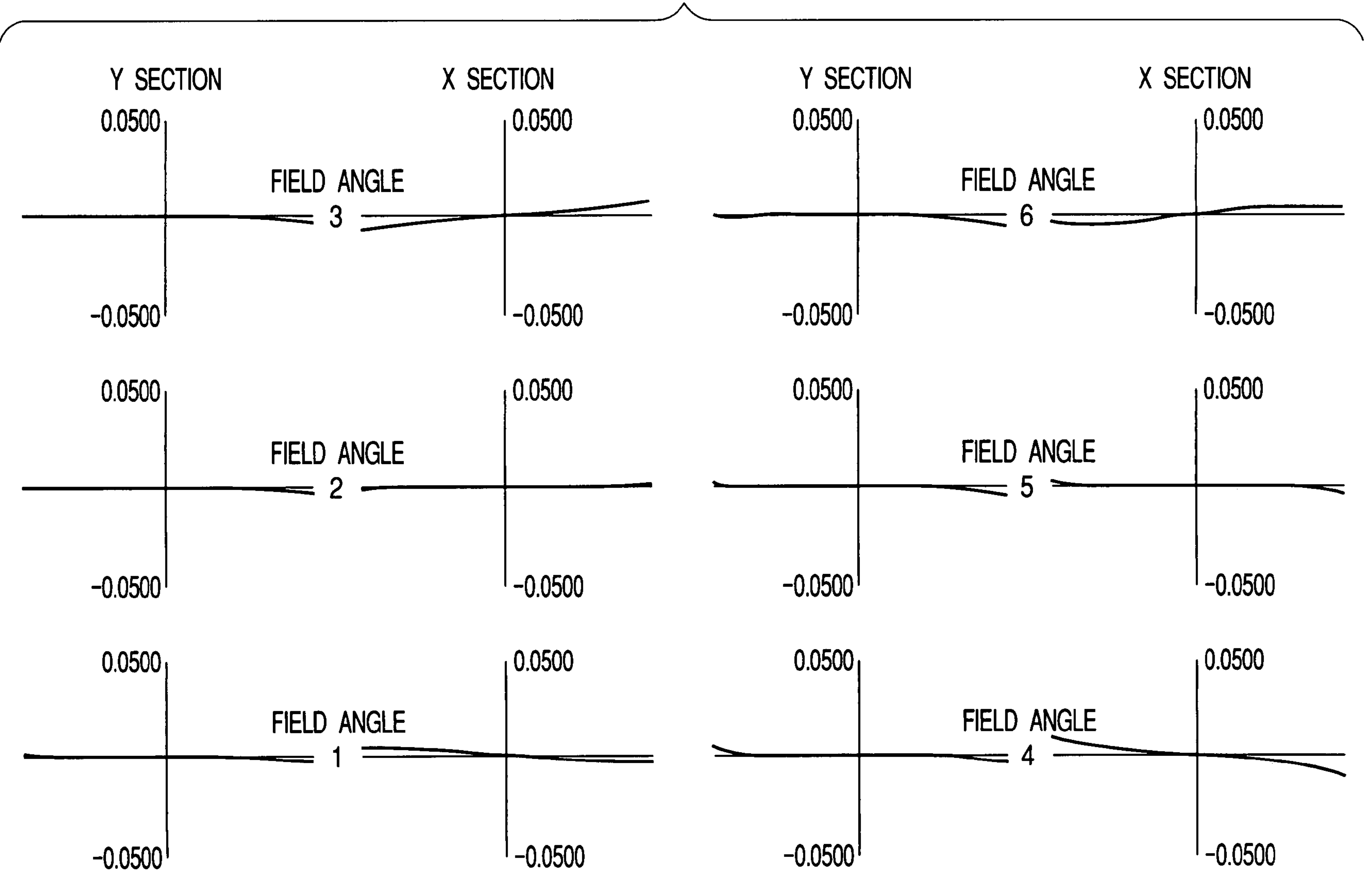
FIG. 7 is a lateral aberration chart in an optical system in accordance with the second embodiment of the present invention.
Figure 11:
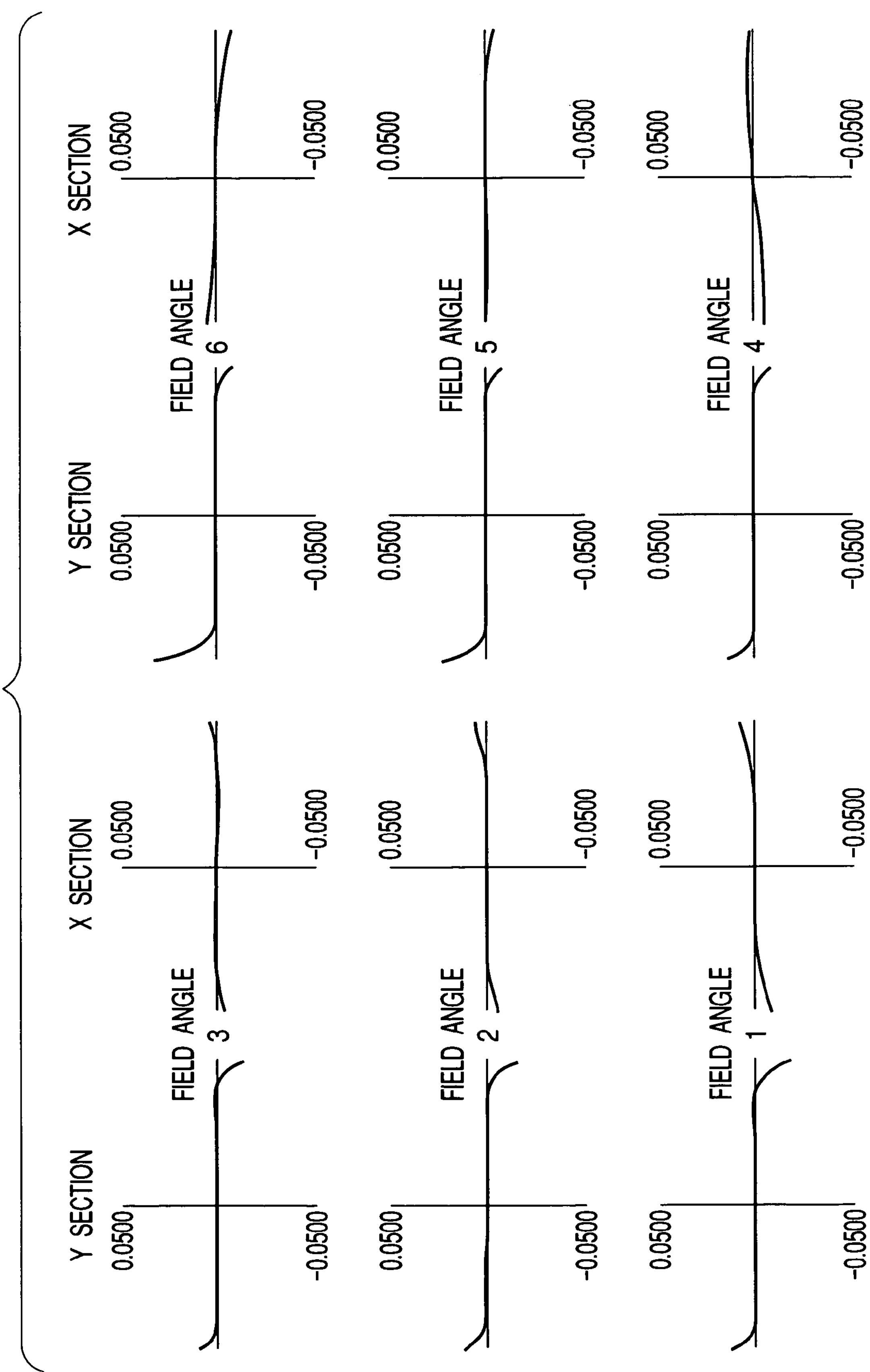
FIG. 11 is a lateral aberration chart of an optical system in accordance with the third embodiment of the present invention.

Note that a diameter of the diaphragm in the optical path is used as a diaphragm diameter, which gives an influence on brightness of the optical system. Further, a lateral aberration chart in an optical system of the embodiment is presented. On the object surface, it is assumed that the center of the screen is set as the origin, and VS and HS represent object surface sizes in the vertical direction (Y direction) and in the horizontal direction (X direction), respectively. The charts of FIGS. 3, 7, and 11 show the lateral aberration of the light flux at respective field angles 1 to 6 in positions (0, VS/2), (0, 0), (0, −VS/2), (HS/2, VS/2), (HS/2, 0), and (HS/2, −VS/2). In the lateral aberration chart, the horizontal axis denotes a height at which light enters the pupil and the vertical axis denotes an aberration amount, i.e., two patterns of aberration in the y section and the x section on an entrance pupil surface. In the respective embodiments, since the surfaces basically take the surface symmetrical shape with the yz surface set as the symmetrical surface, plus and minus directions in the horizontal direction are the same also in the lateral aberration chart. Thus, for simplicity in illustration, the aberration chart is partially omitted regarding the minus direction.

First Embodiment

Figure 1:
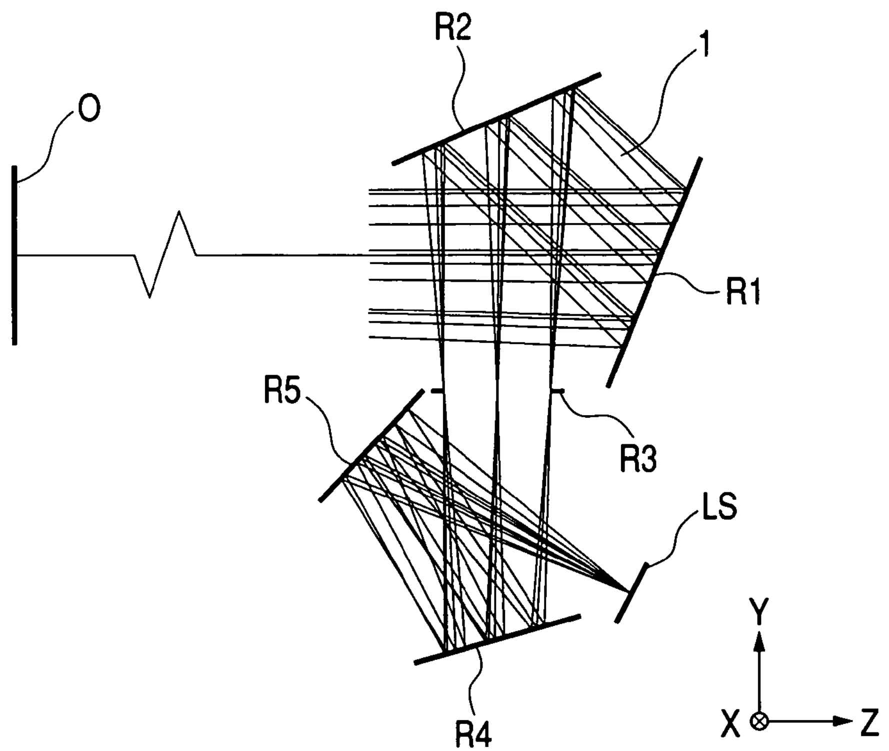
FIG. 1 is a sectional view showing a main part of an entire structure in a YZ surface in accordance with a first embodiment of the present invention.

FIG. 1 is a sectional view of a main part of a first embodiment of the present invention, which shows a case of using as an imaging optical system a reflection optical system. A reflection optical system 1 images image information on the original surface O on the line sensor LS as reading means. The line sensor LS converts the imaged image information into an electrical signal.

The line sensor LS includes plural pixels in the direction (X direction: main scanning direction) perpendicular to the paper surface (YZ surface).

The YZ surface corresponds to the sub-scanning section, while the XZ surface corresponds to the main scanning section. In FIG. 1, the reflection optical system 1 is composed of four reflection surfaces which are arranged in the order of the reflection surface R1, the reflection surface R2, the diaphragm R3, the reflection surface R4, and the reflection surface R5, i.e., in the order of incidence of the light beam from the original surface O. The reflection optical system 1 has a function of forming an image on the original surface O onto the line sensor LS. Also, the length of the line sensor LS in the main scanning direction is 66.08 mm. Assuming that the image information region on the original surface O has a length A in its long side (longitudinal) direction (X direction) and a length B in its short side (widthwise) direction (Y direction), the reflection optical system 1 images on the line sensor LS the image information in the range satisfying $10<A/B$. In this embodiment, the length A is 300 mm in the main scanning direction (X direction) and the length B is ±0.5 mm in the sub-scanning direction (Y direction).

The off-axial reflection surfaces R1, R2, R4, and R5 are formed such that the optical path is folded within the section in the Y direction, which is perpendicular to the line extending in the X direction in which the sensors of the line sensor LS are arranged, i.e., within the sub-scanning section (YZ section). With this structure, the distance between the reflection surfaces can be reduced to achieve the compact optical system capable of coping with the decentering error.

Also, if an intermediate image plane is formed, the effective diameter of the reflection surface can be reduced. However, any relay system is required therefor, resulting in the increased optical path length. Further, when the power of each reflection surface is increased for reducing the optical path length, the decentering error is easily caused. Therefore, in this embodiment, the length in the widthwise direction of the object surface O is made small to thereby reduce the effective diameter of the reflection surface, so that the distance between the surfaces can be shortened without forming the intermediate image plane.

In this embodiment, the number of reflection surfaces on the object surface side as viewed from the diaphragm is represented by X and that on the image plane side from the diaphragm is represented by Y. Based on the above assumption, the number of reflection surfaces is set so as to satisfy the following conditional expression:

$$0.65<X/Y<1.6$$

Such setting enables the miniaturization of the entire optical system. Note that in this embodiment, X and Y each correspond to 2.

Hereinafter, constituent data 1 of the reflection optical system used in this embodiment will be shown.

(Constituent data 1)

Diaphragm diameter 7 mm; Distance from the original O to the first reflection Surface Rl 215 mm

| i | Yi | Zi | Si | Di | |
|---|---|---|---|---|---|
| 1 | 0.00 | 0.00 | 0.00 | 14.00 | Reflection surface |
| 2 | 5.02 | −13.07 | −45.80 | 18.82 | Reflection surface |
| 3 | −12.73 | −6.82 | −70.61 | 16.75 | Diaphragm |
| 4 | −28.53 | −1.26 | −52.61 | 15.00 | Reflection surface |
| 5 | −20.02 | −13.61 | −19.99 | 20.10 | Reflection surface |
| 6 | −21.90 | 6.41 | −5.37 | | Image surface |

Aspherical surface shape

| | | | |
|---|---|---|---|
| R1 | C02 = −1.25334e−003 | C20 = −1.98983e−003 | |
| | C03 = −4.39691e−006 | C21 = 3.17010e−005 | |
| | C04 = −5.01914e−006 | C22 = 1.76226e−006 | C40 = 3.23561e−007 |
| | C05 = −4.89294e−007 | C23 = 2.68543e−008 | C41 = 1.53626e−008 |
| | C06 = 1.33601e−008 | C24 = −5.17634e−009 | C42 = 6.99521e−010 |
| | C60 = −2.01886e−011 | | |
| R2 | C02 = 2.04739e−003 | C20 = 1.68391e−003 | |
| | C03 = −3.30589e−005 | C21 = 4.02265e−005 | |
| | C04 = −5.56592e−006 | C22 = 1.29287e−006 | C40 = 1.06023e−007 |
| | C05 = −5.32706e−007 | C23 = −7.60191e−010 | C41 = 5.26814e−009 |
| | C06 = 6.66227e−009 | C24 = −4.49951e−009 | C42 = 3.19119e−010 |
| | C60 = −5.23085e−011 | | |
| R4 | C02 = −2.30632e−003 | C20 = −2.66051e−003 | |
| | C03 = −1.40655e−004 | C21 = 6.48334e−005 | |
| | C04 = 2.90983e−006 | C22 = −2.94701e−006 | C40 = −4.92370e−008 |
| | C05 = −4.70846e−007 | C23 = 7.09367e−008 | C41 = 3.84821e−008 |
| | C06 = 1.25599e−008 | C24 = 2.69396e−008 | C42 = 6.58982e−010 |
| | C60 = 1.18370e−010 | | |
| R5 | C02 = 2.59282e−003 | C20 = 3.56214e−003 | |
| | C03 = −2.28368e−004 | C21 = 9.44606e−005 | |
| | C04 = 2.09096e−005 | C22 = −8.90811e−007 | C40 = −9.55955e−007 |
| | C05 = 1.46285e−006 | C23 = −2.84382e−007 | C41 = 5.66988e−008 |
| | C06 = 5.47681e−008 | C24 = 5.57862e−009 | C42 = −1.80141e−010 |
| | C60 = 3.16988e−011 | | |

As shown in FIG. 1, the optical path extending from the original surface O to the reflection surface R1 crosses the optical path extending from the reflection surface R2 to the diaphragm R3. Further, the optical path extending from the diaphragm R3 to the reflection surface R4 crosses the optical path extending from the reflection surface R5 to the line sensor LS. In this way, the optical paths cross each other at the plural positions, which makes it possible to prevent the light beam traveling in the optical path from protruding from the predetermined surface while reducing the angle between the normal line of the reflection surface and the reference axis. The smaller the angle between the normal line of the reflection surface and the reference axis, the easier the control of the aberration. Thus, the necessary number of reflection surfaces can be made small.

In FIG. 1, the optical paths cross each other once ahead of the diaphragm and once behind it, i.e., they cross twice in total. However, the number of times they cross each other is not limited to this. The optical paths may cross plural times ahead of the diaphragm and behind it.

As in the present invention, when the optical system with the wide field angle is adopted, the optical system on the object surface side as viewed from the diaphragm tends to increase its size. Therefore, by reducing the number of reflection surfaces on the object surface side from the diaphragm, the entire optical system can be effectively made compact. As a result, it is preferable to reduce the number of reflection surfaces by crossing the optical paths ahead of the diaphragm.

On the other hand, the distance between the surfaces should be larger for crossing the optical paths. As the distance between the reflection surfaces becomes larger, the positional deviation of the light beam due to the surface inclination error increases.

Also, the involved positional deviation increases with an increase in the optical power of the surface exhibiting the inclination error. Therefore, the product of the optical power of each surface and the distance up to the subsequent surface is used as an index. Then, the obtained value is set to a predetermined value or lower, so that the occurrence of the positional deviation of the light beam resulting from the surface inclination error can be suppressed. To be specific, it is assumed that a refractive power (power) of the reflection surface within the surface (sub-scanning section) perpendicular to the main scanning direction is represented by P ($mm^{-1}$) and a distance from the reflection surface to the subsequent optical surface along the reference axis is represented by S (mm). The product of P and S, i.e., $|P|S$, is preferably 0.5 or less. If $|P|S$ is 0.5 or more, even the slight surface inclination error causes the large positional deviation of the light beam, thereby significantly degrading the performance. Thus, in order to cope therewith, the reflection surface needs to be maintained with precision. In this embodiment, the value of $|P|S$ in each surface is as follows.

R1: $|P|S=0.00537004\times14=0.075181$

R2: $|P|S=0.00902189\times35.5697=0.320906$

R4: $|P|S=0.00970005\times14.9985=0.145486$ (except for the surface R5 because no optical surface follows the surface R5)

Figure 2:
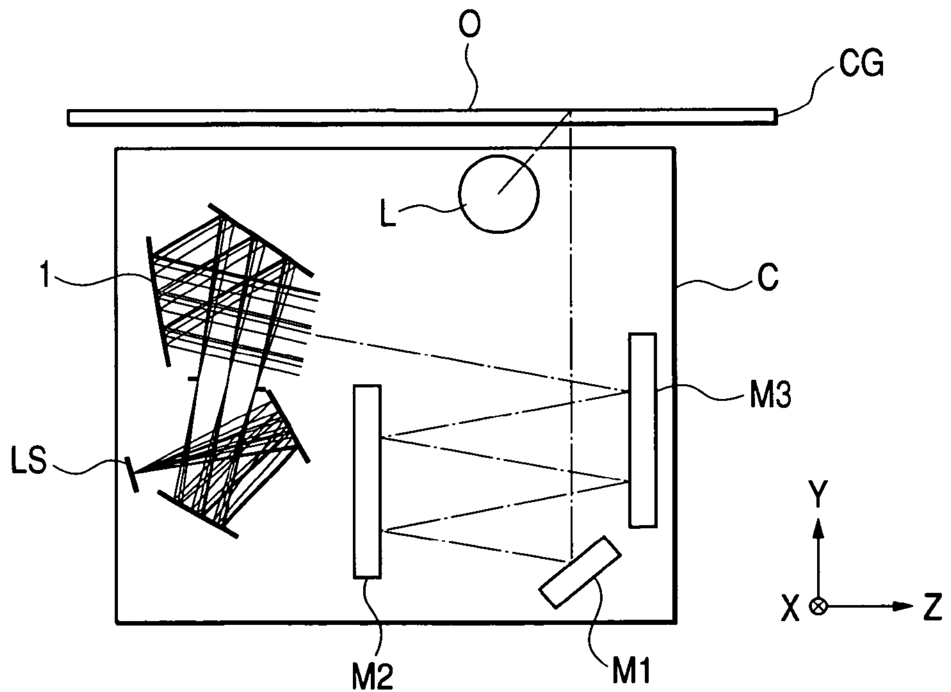
FIG. 2 is a schematic diagram showing a main part of an image reading apparatus in accordance with the first embodiment of the present invention.
Figure 16:
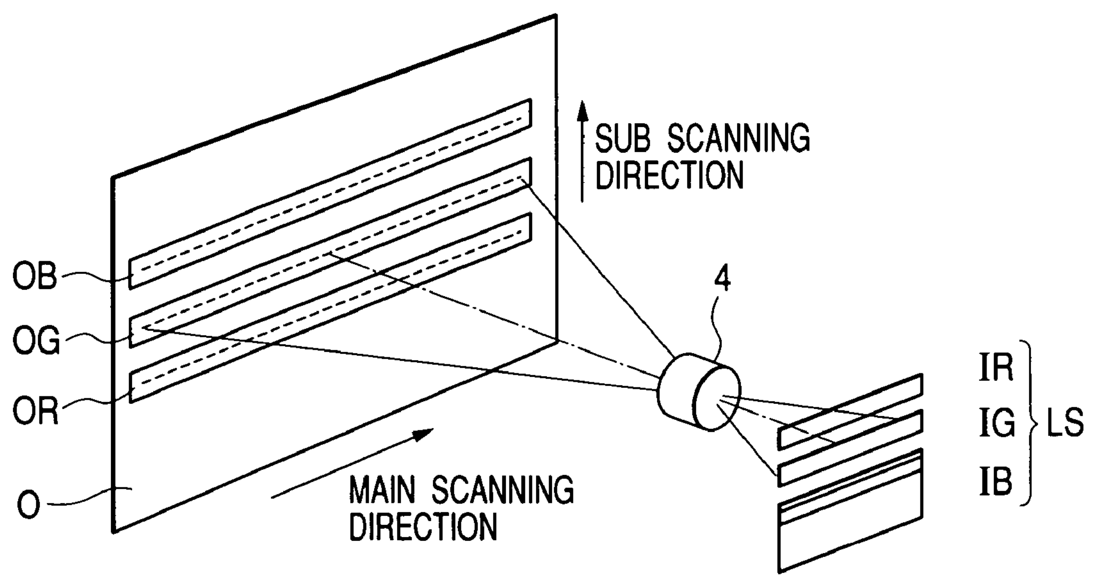
FIG. 16 is a schematic diagram illustrating a main part of a conventional color image reading apparatus.

FIG. 2 is a sectional view showing a main part of an embodiment in which the reflection optical system 1 according to the first embodiment shown in FIG. 1 is used to form the original reading apparatus for reading a color or monochrome image. In the case where the image reading apparatus of this embodiment is employed while setting a color image as the target image information, the sensor LS shown in FIG. 16 is used. In FIG. 2, reference symbol L indicates a light source; CG, an original table glass; M1, M2, and M3, a first reflection mirror, a second reflection mirror, and a third reflection mirror; 1, a reflection optical system; LS, a line sensor composed of a CCD or the like; and C, a carriage (housing). The information of the original O placed on the original table glass CG can be imaged on the line sensor LS through the mirrors M1 to M3 by the reflection optical system 1 to read the image information in one line on the original O.

In order to form the compact original reading apparatus, the optical paths are folded back through the first to third reflection mirrors M1 to M3. The reflection optical system 1 is mainly composed of the reflection surfaces, so that little chromatic aberration occurs. Thus, the optical power can be enhanced, thereby achieving the wide field angle. Also, the entire optical system can be made compact, and hence the original reading apparatus of the carriage integral type optical system can be composed of fewer optical components including three plane mirrors and the optical reflection system 1. In the carriage integral type optical system, a surface of the original O is read two-dimensionally by relatively moving the original O and the carriage C in a direction perpendicular to the line direction (X direction) of the line sensor LS, that is, the sub-scanning direction (Z direction) to scan the original O.

Figure 4:
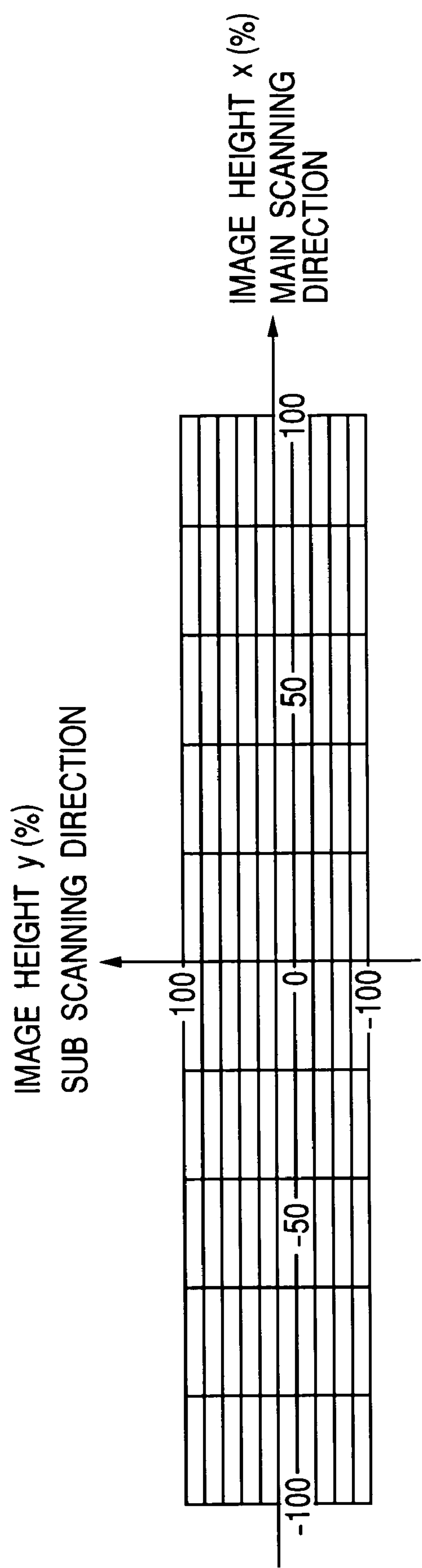
FIG. 4 shows distortion in the optical system in accordance with the first embodiment of the present invention.

FIG. 3 shows the lateral aberration on the line sensor LS and FIG. 4 shows the distortion. Here, in FIG. 4, since the image in the sub-scanning direction is extremely narrow, the image is represented in 50-magnification with respect to the scale of the image in the main scanning direction. As shown in FIGS. 3 and 4, despite the wide field angle, the sufficient performance can be secured.

In this embodiment, the rotationally asymmetrical reflection surfaces take a symmetrical shape with respect to the YZ surface. However, the present invention is not limited to this. Also, the number of surfaces in the reflection optical system and arrangement thereof are not limited to those specified in this embodiment.

Second Embodiment

Figure 5:
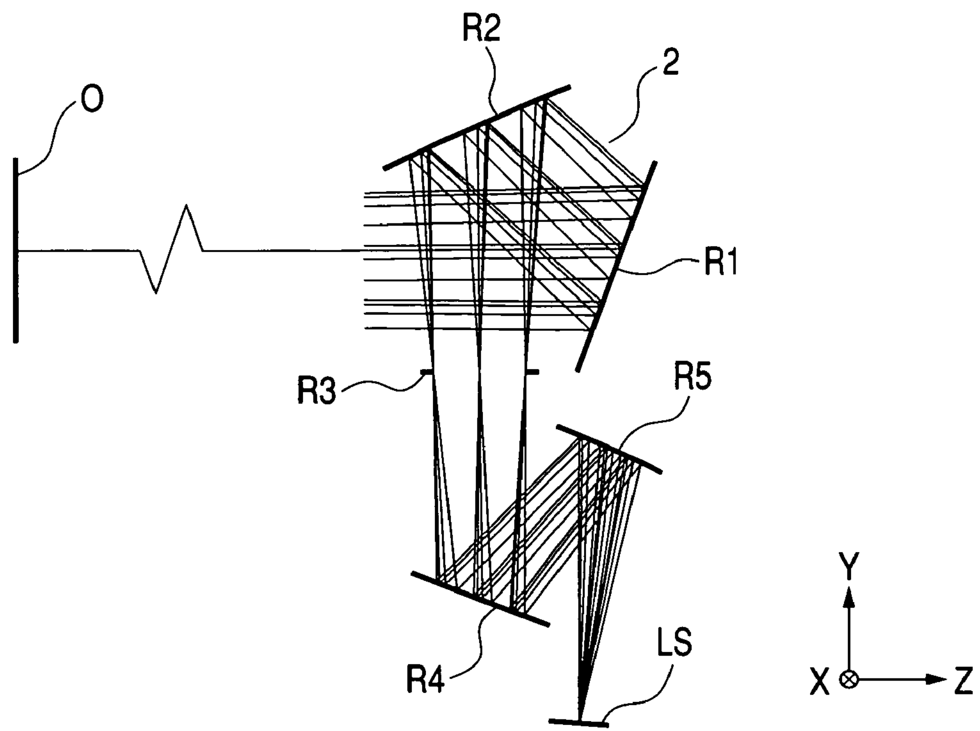
FIG. 5 is a sectional view showing a main part of an entire structure in a YZ surface in accordance with a second embodiment of the present invention.

FIG. 5 is a sectional view of a main part of a second embodiment of the reflection optical system. In this embodiment, a reflection optical system 2 images image information on the original surface O on the line sensor LS. In FIG. 5, the reflection optical system 2 is composed of four reflection surfaces which are arranged in the order of the reflection surface R1, the reflection surface R2, the diaphragm R3, the reflection surface R4, and the reflection surface R5, i.e., in the order of incidence of the light beam from the original surface O. The reflection optical system 2 has a function of forming an image on the original surface O onto the line sensor LS.

The length of the line sensor LS in the main scanning direction is 66.08 mm. A width of the image to be read is 300 mm in the main scanning direction and ±0.5 mm in the sub-scanning direction. The off-axial reflection surfaces R1, R2, R4, and R5 are formed such that the optical path is folded within the section in the Y direction, which is perpendicular to the line extending in the X direction in which the sensors of the line sensor LS are arranged, i.e., within the sub-scanning section (YZ section). With this structure, the distance between the reflection surfaces can be reduced to achieve the compact optical system capable of coping with the decentering error.

Also, if an intermediate image plane is formed, the effective diameter of the reflection surface can be reduced. However, any relay system is required therefor, resulting in the increased optical path length. Further, when the power of each reflection surface is increased for reducing the optical path length, the decentering error is easily caused. Therefore, in this embodiment, the length in the widthwise direction of the object surface O is made small to thereby reduce the effective diameter of the reflection surface, so that the distance between the surfaces can be shortened without forming the intermediate image plane.

Hereinafter, constituent data 2 of the reflection optical system used in this embodiment will be shown.

(Constituent data 2)

Diaphragm diameter 7 mm — Distance from the original O to the first reflection surface R1 215 mm

| i | Yi | Zi | Si | Di | |
|---|---|---|---|---|---|
| 1 | 0.00 | 0.00 | 0.00 | 14.00 | Reflection surface |
| 2 | 5.02 | −13.07 | −45.80 | 18.82 | Reflection surface |
| 3 | −12.73 | −6.82 | −70.61 | 16.75 | Diaphragm |
| 4 | −28.53 | −1.26 | −89.39 | 15.00 | Reflection surface |
| 5 | −14.50 | 4.02 | −87.39 | 20.80 | Reflection surface |
| 6 | −34.55 | 9.54 | −74.61 | | Image surface |

Aspherical surface shape

| | | | |
|---|---|---|---|
| R 1 | C02 = −1.18222e − 003 | C20 = −2.12177e − 003 | |
| | C03 = −1.84831e − 005 | C21 = 3.66380e − 005 | |
| | C04 = −3.16841e − 006 | C22 = 1.75714e − 006 | C40 = 3.04588e − 007 |
| | C05 = −6.32615e − 007 | C23 = 2.05370e − 008 | C41 = 1.56058e − 008 |
| | C06 = 1.24040e − 008 | C24 = −6.08244e − 009 | C42 = 6.97817e − 010 |
| | C60 = −2.60879e − 011 | | |
| R 2 | C02 = 2.12606e − 003 | C20 = 1.27350e − 003 | |
| | C03 = −3.92792e − 005 | C21 = 7.05616e − 005 | |
| | C04 = −7.19073e − 007 | C22 = 6.42330e − 007 | C40 = 1.01407e − 007 |
| | C05 = −7.25877e − 007 | C23 = 9.55640e − 009 | C41 = 7.91095e − 009 |
| | C06 = −4.25452e − 009 | C24 = −7.19969e − 009 | C42 = 1.82292e − 010 |
| | C60 = −5.79126e − 011 | | |
| R 4 | C02 = −1.95847e − 003 | C20 = −3.29395e − 003 | |
| | C03 = −1.24925e − 004 | C21 = 6.52364e − 005 | |
| | C04 = 2.72284e − 005 | C22 = −4.03301e − 006 | C40 = −7.06163e − 008 |
| | C05 = −1.10588e − 006 | C23 = 5.46330e − 008 | C41 = 4.92119e − 008 |
| | C06 = −6.15869e − 008 | C24 = 2.80469e − 008 | C42 = −2.92200e − 009 |
| | C60 = 8.66988e − 011 | | |
| R 5 | C02 = 2.88767e − 003 | C20 = 2.99552e − 003 | |
| | C03 = −1.43964e − 004 | C21 = −2.44523e − 005 | |
| | C04 = 7.99954e − 005 | C22 = −4.22371e − 007 | C40 = −8.77293e − 007 |
| | C05 = 4.34388e − 006 | C23 = 1.29905e − 007 | C41 = 3.72629e − 008 |
| | C06 = −1.13398e − 006 | C24 = 8.19662e − 009 | C42 = −1.99231e − 009 |
| | C60 = 1.99340e − 010 | | |

As shown in FIG. 5, the optical path extending from the original surface O to the reflection surface R1 crosses the optical path extending from the reflection surface R2 to the diaphragm R3. In this way, the optical paths cross each other at the plural positions, which makes it possible to prevent the light beam traveling in the optical path from protruding from the predetermined surface while reducing the angle between the normal line of the reflection surface and the reference axis. The smaller the angle between the normal line of the reflection surface and the reference axis, the easier the control of the aberration. Thus, the necessary number of reflection surfaces can be made small. As in the present invention, when the optical system with the wide field angle is adopted, the optical system on the object surface side as viewed from the diaphragm tends to increase its size. Therefore, by reducing the number of reflection surfaces on the object surface side from the diaphragm, the entire optical system can be effectively made compact. As a result, it is preferable to reduce the number of reflection surfaces by crossing the optical paths ahead of the diaphragm.

On the other hand, the distance between the surfaces should be larger for crossing the optical paths. As the distance between the reflection surfaces becomes larger, the positional deviation of the light beam due to the surface inclination error increases. Also, the involved positional deviation increases with an increase in the optical power of the surface exhibiting the inclination error. Therefore, the product of the optical power of each surface and the distance up to the subsequent surface is used as an index. Then, the obtained value is set to a predetermined value or lower, so that the occurrence of the positional deviation of the light beam resulting from the surface inclination error can be suppressed.

To be specific, it is assumed that a refractive power (power) of the reflection surface within the surface (sub-scanning section) perpendicular to the main scanning direction is represented by P ($mm^{-1}$) and a distance from the reflection surface to the subsequent optical surface along the reference axis is represented by S (mm). The product of P and S, i.e., $|P|S$, is preferably 0.5 or less. If $|P|S$ is 0.5 or more, even the slight surface inclination error causes the large positional deviation of the light beam, thereby significantly degrading the performance. Thus, in order to cope therewith, the reflection surface needs to be maintained with precision. In this embodiment, the value of $|P|S$ in each surface is as follows.

R1: $|P|S=0.00506534\times14=0.070915$

R2: $|P|S=0.00936854\times35.5697=0.333236$

R4: $|P|S=0.00833666\times14.9985=0.125037$ (except for the surface R5 because no optical surface follows the surface R5)

Figure 6:
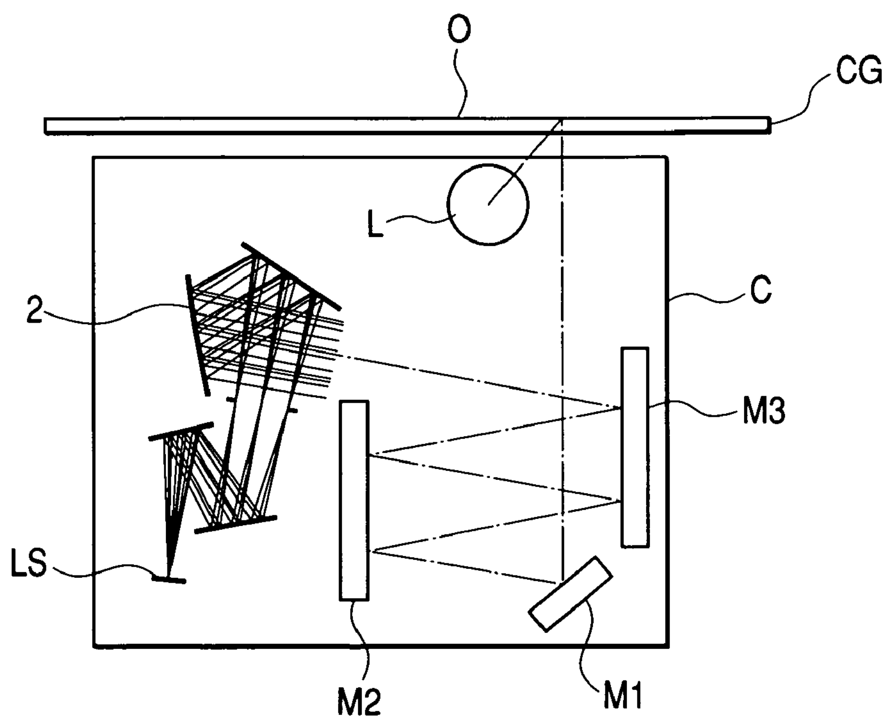
FIG. 6 is a schematic diagram showing a main part of an image reading apparatus in accordance with the second embodiment of the present invention.

FIG. 6 is a sectional view showing a main part of an embodiment in which the reflection optical system 2 according to the second embodiment shown in FIG. 5 is used to form the original reading apparatus for reading a color or monochrome image. In the case where the image reading apparatus of this embodiment is employed while setting a color image as the target image information, the sensor LS shown in FIG. 16 is used. In FIG. 6, reference symbol L indicates a light source; CG, an original table glass; M1, M2, and M3, a first reflection mirror, a second reflection mirror, and a third reflection mirror; 2, a reflection optical system; LS, a line sensor composed of a CCD or the like; and C, a carriage (housing). The information of the original O placed on the original table glass CG can be imaged on the line sensor LS through the mirrors M1 to M3 by the reflection optical system 2 to read the image information in one line on the original O.

In order to form the compact original reading apparatus, the optical paths are folded back through the first to third reflection mirrors M1 to M3. The reflection optical system 2 is mainly composed of the reflection surfaces, so that little chromatic aberration occurs. Thus, the optical power can be enhanced, thereby achieving the wide field angle. Also, the entire optical system can be made compact, and hence the original reading apparatus of the carriage integral type optical system can be composed of fewer optical components including three plane mirrors and the optical reflection system 2. In the carriage integral type optical system, a surface of the original O is read two-dimensionally by relatively moving the original O and the carriage C in a direction perpendicular to the line direction (X direction) of the line sensor LS, that is, the sub-scanning direction.

Figure 8:
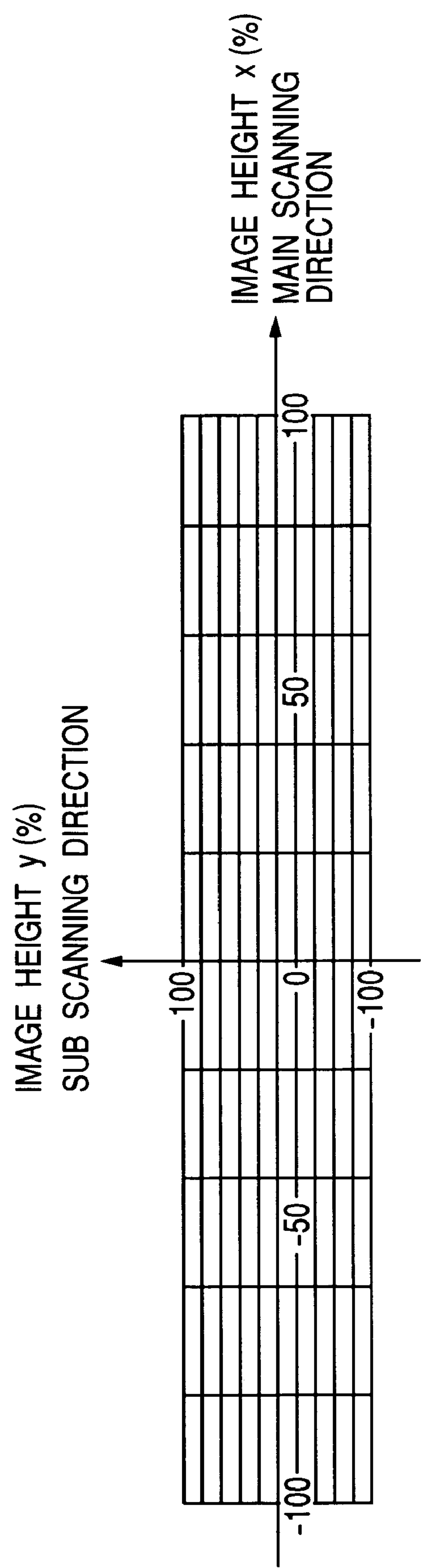
FIG. 8 shows distortion in the optical system in accordance with the second embodiment of the present invention.

FIG. 7 shows the lateral aberration on the line sensor LS and FIG. 8 shows the distortion. Here, in FIG. 8, since the image in the sub-scanning direction is extremely narrow, the image is represented in 50-magnification with respect to the scale of the image in the main scanning direction. As shown in FIGS. 7 and 8, despite the wide field angle, the sufficient performance can be secured.

In this embodiment, the rotationally asymmetrical reflection surfaces take a symmetrical shape with respect to the YZ surface. However, the present invention is not limited to this. Also, the number of surfaces in the reflection optical system and arrangement thereof are not limited to those specified in this embodiment.

Third Embodiment

Figure 9:
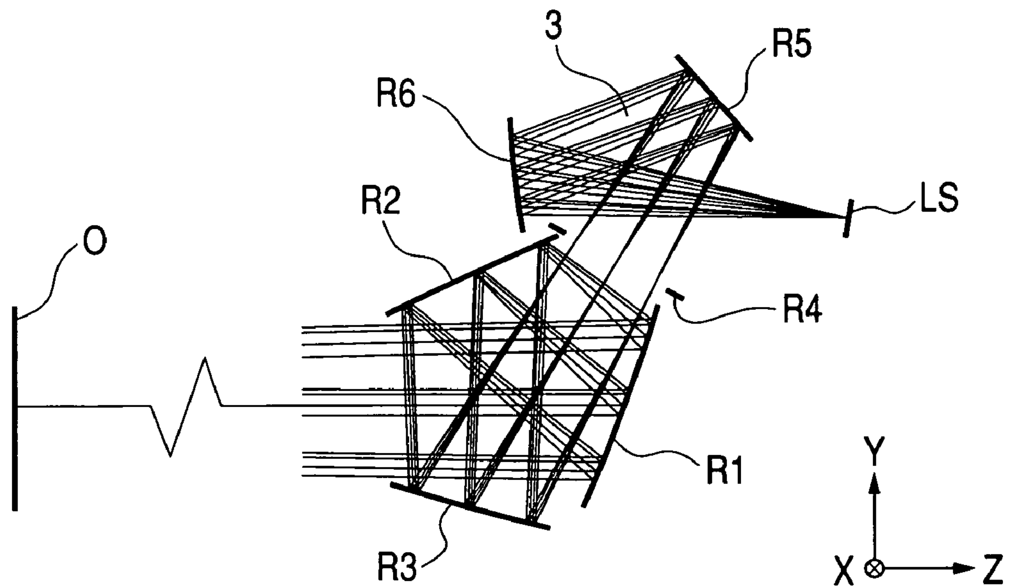
FIG. 9 is a sectional view showing a main part of an entire structure in a YZ surface in accordance with a third embodiment of the present invention.

FIG. 9 is a sectional view of a main part of a third embodiment of the reflection optical system. In this embodiment, a reflection optical system 3 images image information on the original surface O on the line sensor LS. In FIG. 9, the reflection optical system 3 is composed of five reflection surfaces which are arranged in the order of the reflection surface R1, the reflection surface R2, the reflection surface R3, the diaphragm R4, the reflection surface R5, and the reflection surface R6, i.e., in the order of incidence of the light beam from the original surface O. The reflection optical system 3 has a function of forming an image on the original surface O onto the line sensor LS.

Also, the length of the line sensor LS in the main scanning direction is 66.08 mm. A width of the image to be read is 300 mm in the main scanning direction and ±0.5 mm in the sub-scanning direction.

The off-axial reflection surfaces R1, R2, R3, R5, and R6 are formed such that the optical path is folded within the section in the Y direction, which is perpendicular to the line extending in the X direction in which the sensors of the line sensor LS are arranged, i.e., within the sub-scanning section (YZ section). With this structure, the distance between the reflection surfaces can be reduced to achieve the compact optical system capable of coping with the decentering error.

Also, if an intermediate image plane is formed, the effective diameter of the reflection surface can be reduced. However, any relay system is required therefor, resulting in the increased optical path length. Further, when the power of each reflection surface is increased for reducing the optical path length, the decentering error is easily caused. Therefore, in this embodiment, the length in the widthwise direction of the object surface O is made small to thereby reduce the effective diameter of the reflection surface, so that the distance between the surfaces can be shortened without forming the intermediate image plane.

Hereinafter, constituent data 3 of the reflection optical system used in this embodiment will be shown.

(Constituent data 3)

Diaphragm diameter 6.8 mm — Distance from the original O to the first reflection surface R1 215 mm

| i | Yi | Zi | Si | Di | |
|---|---|---|---|---|---|
| 1 | 0.00 | 0.00 | 0.00 | 12.00 | Reflection surface |
| 2 | 4.10 | −11.28 | −46.00 | 15.00 | Reflection surface |
| 3 | −10.16 | −6.64 | −86.00 | 18.00 | Reflection surface |
| 4 | 7.56 | −3.52 | −80.00 | 12.00 | Diaphragm |
| 5 | 19.38 | −1.43 | −60.00 | 13.00 | Reflection surface |
| 6 | 11.03 | −11.39 | −25.38 | 20.91 | Reflection surface |
| 7 | 14.93 | 9.16 | −10.76 | | Image surface |

Aspherical surface shape

| | | | |
|---|---|---|---|
| R 1 | C02 = −1.88417e − 003 | C20 = −8.64736e − 004 | |
| | C03 = −1.68970e − 004 | C21 = 3.64497e − 005 | |
| | C04 = −2.65213e − 006 | C22 = 3.58457e − 008 | C40 = 2.49501e − 007 |
| | C05 = 3.77754e − 007 | C23 = −3.39305e − 008 | C41 = 1.44115e − 009 |
| | C06 = −1.79367e − 008 | C24 = −1.97853e − 009 | C42 = 2.04104e − 010 |
| | C60 = −1.69261e − 011 | | |
| R 2 | C02 = 1.12854e − 003 | C20 = 1.53984e − 003 | |
| | C03 = −4.05868e − 004 | C21 = 5.58777e − 005 | |
| | C04 = −6.15360e − 006 | C22 = −2.42979e − 006 | C40 = −3.29671e − 008 |
| | C05 = 1.02726e − 007 | C23 = −1.59033e − 008 | C41 = −7.24116e − 009 |
| | C06 = −5.52127e − 009 | C24 = −8.42802e − 009 | C42 = 1.23605e − 009 |
| | C60 = 9.99068e − 012 | | |

-continued

| (Constituent data 3) | | | |
|---|---|---|---|
| R 3 | C02 = −9.95180e − 004 | C20 = −1.44591e − 003 | |
| | C03 = −4.81939e − 004 | C21 = 2.73366e − 005 | |
| | C04 = 1.40151e − 005 | C22 = −4.88407e − 006 | C40 = 9.22973e − 008 |
| | C05 = −1.36714e − 006 | C23 = 1.48292e − 007 | C41 = −6.73044e − 009 |
| | C06 = 3.60964e − 008 | C24 = −9.73048e − 009 | C42 = 3.85337e − 009 |
| | C60 = 2.99220e − 011 | | |
| R 5 | C02 = −3.88273e − 003 | C20 = 3.08128e − 003 | |
| | C03 = −4.35467e − 004 | C21 = −7.97993e − 006 | |
| | C04 = 3.44123e − 005 | C22 = 4.45742e − 007 | C40 = −2.98434e − 007 |
| | C05 = −1.93773e − 005 | C23 = 4.13135e − 007 | C41 = 2.41491e − 009 |
| | C06 = −1.83147e − 006 | C24 = 2.96403e − 008 | C42 = 8.10757e − 009 |
| | C60 = 1.34348e − 010 | | |
| R 6 | C02 = −9.62236e − 003 | C20 = −2.24882e − 003 | |
| | C03 = −1.78289e − 004 | C21 = −3.91825e − 005 | |
| | C04 = 5.22975e − 005 | C22 = 1.31639e − 006 | C40 = 9.41754e − 007 |
| | C05 = −1.93745e − 005 | C23 = −4.63244e − 007 | C41 = −1.27567e − 008 |
| | C06 = 2.47750e − 007 | C24 = 8.85850e − 008 | C42 = 2.56188e − 009 |
| | C60 = −1.67003e − 010 | | |

As shown in FIG. 9, the optical path extending from the original surface O to the reflection surface R1 crosses the optical path extending from the reflection surface R2 to the reflection surface R3, the optical path extending from the original surface O to the reflection surface R1 crosses the optical path extending from the reflection surface R3 to the diaphragm R4, and the optical path extending from the reflection surface R1 to the reflection surface R2 crosses the optical path extending from the reflection surface R3 to the diaphragm R4, i.e., at three positions. In this way, the optical paths cross each other at the plural positions, which makes it possible to prevent the light beam traveling in the optical path from protruding from the predetermined surface while reducing the angle between the normal line of the reflection surface and the reference axis. The smaller the angle between the normal line of the reflection surface and the reference axis, the easier the control of the aberration. Thus, the necessary number of reflection surfaces can be made small. As in the present invention, when the optical system with the wide field angle is adopted, the optical system on the object surface side as viewed from the diaphragm tends to increase its size. Therefore, by reducing the number of reflection surfaces on the object surface side from the diaphragm, the entire optical system can be effectively made compact. As a result, it is preferable to reduce the number of reflection surfaces by crossing the optical paths ahead of the diaphragm.

On the other hand, the distance between the surfaces should be larger for crossing the optical paths. As the distance between the reflection surfaces becomes larger, the positional deviation of the light beam due to the surface inclination error increases. Also, the involved positional deviation increases with an increase in the optical power of the surface exhibiting the inclination error. Therefore, the product of the optical power of each surface and the distance up to the subsequent surface is used as an index. Then, the obtained value is set to a predetermined value or lower, so that the occurrence of the positional deviation of the light beam resulting from the surface inclination error can be suppressed.

To be specific, it is assumed that a refractive power (power) of the reflection surface within the surface (sub-scanning section) perpendicular to the main scanning direction is represented by P ($mm^{-1}$) and a distance from the reflection surface to the subsequent optical surface along the reference axis is represented by S (mm). The product of P and S, i.e., $|P|S$, is preferably 0.5 or less. If $|P|S$ is 0.5 or more, even the slight surface inclination error causes the large positional deviation of the light beam, thereby significantly degrading the performance. Thus, in order to cope therewith, the reflection surface needs to be maintained with precision. In this embodiment, the value of $|P|S$ in each surface is as follows.

R1: $|P|S=0.00802038\times12=0.0962445$

R2: $|P|S=0.00502248\times15=0.0753372$

R3: $|P|S=0.00410259\times30=0.123078$

R5: $|P|S=0.0165277\times13=0.21486$ (except for the surface R6 because no optical surface follows the surface R6)

Figure 10:
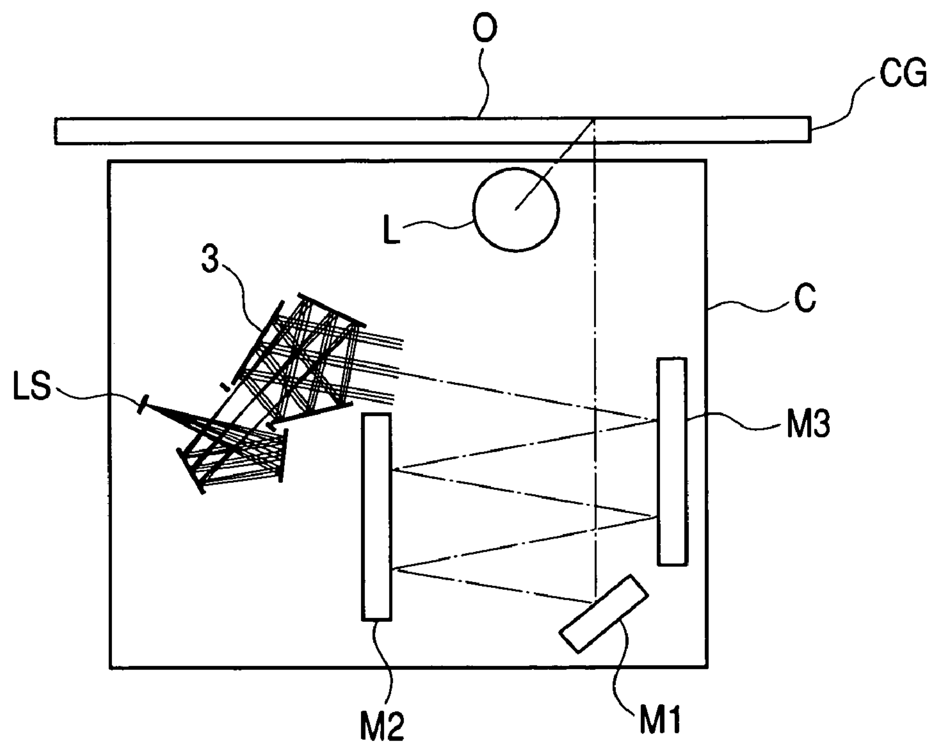
FIG. 10 is a schematic diagram showing a main part of an image reading apparatus in accordance with the third embodiment of the present invention.

FIG. 10 is a sectional view showing a main part of an embodiment in which the reflection optical system 3 according to the third embodiment shown in FIG. 9 is used to form the original reading apparatus for reading a color or monochrome image. In the case where the image reading apparatus of this embodiment is employed while setting a color image as the target image information, the sensor LS shown in FIG. 16 is used. In FIG. 10, reference symbol L indicates a light source; CG, an original table glass; M1, M2, and M3, a first reflection mirror, a second reflection mirror, and a third reflection mirror; 3, a reflection optical system; LS, a line sensor composed of a CCD or the like; and C, a carriage (housing). The information of the original O placed on the original table glass CG can be imaged on the line sensor LS through the mirrors M1 to M3 by the reflection optical system 3 to read the image information in one line on the original O.

In order to form the compact original reading apparatus, the optical paths are folded back through the first to third reflection mirrors M1 to M3. The reflection optical system 3 is mainly composed of the reflection surfaces, so that little chromatic aberration occurs. Thus, the optical power can be enhanced, thereby achieving the wide field angle. Also, the entire optical system can be made compact, and hence the original reading apparatus of the carriage integral type optical system can be composed of fewer optical components including three plane mirrors and the optical reflection system 3. In the carriage integral type optical system, a surface of the original O is read two-dimensionally by relatively moving the original O and the carriage C in a direction perpendicular to the line direction (X direction) of the line sensor LS, that is, the sub-scanning direction.

Figure 12:
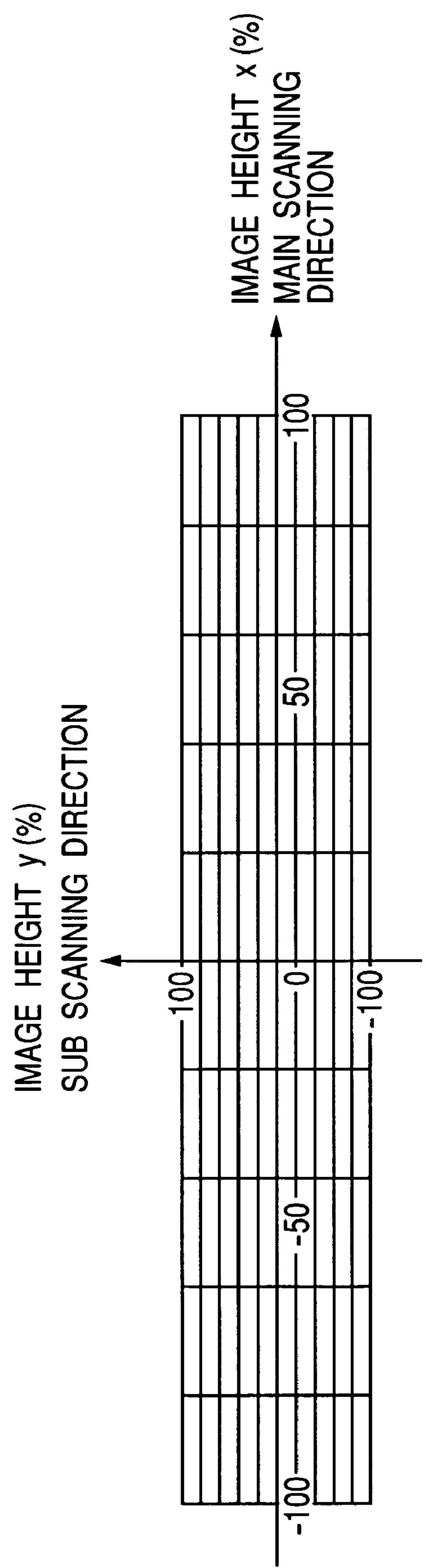
FIG. 12 shows distortion in the optical system in accordance with the third embodiment of the present invention.

FIG. 11 shows the lateral aberration on the line sensor LS and FIG. 12 shows the distortion. Here, in FIG. 12, since the image in the sub-scanning direction is extremely narrow, the image is represented in 50-magnification with respect to the scale of the image in the main scanning direction. As shown in FIGS. 11 and 12, despite the wide field angle, the sufficient performance can be secured.

In this embodiment, the rotationally asymmetrical reflection surfaces take a symmetrical shape with respect to the YZ surface. However, the present invention is not limited to this. Also, the number of surfaces in the reflection optical system and arrangement thereof are not limited to those specified in this embodiment.

Note that the reflection optical system of the present invention is applicable to a color copier, a monochrome copier, and an image scanner.

According to the aforementioned embodiments, in the image reading apparatus for reading the color or monochrome image information by the line sensor or reflection optical system (imaging optical system), the reflection optical system is composed of the imaging optical elements including the off-axial reflection surfaces having the different curvatures. Consequently, the image reading can be achieved with the high definition, which is free of the color drift, in the case of the color image. At the same time, with the compact structure, the carriage integral type optical system can be realized.

What is claimed is:

1. An imaging optical system for imaging information on an object surface in a region having a length (A) in a long side direction and a length (B) in a short side direction which satisfy a relation of A/B>10, on an image plane, comprising:

a diaphragm;

a first set of a plurality of off-axial reflection surfaces arranged on the object surface side from the diaphragm; and a second set of a plurality of off-axial reflection surfaces arranged on the image plane side from the diaphragm, wherein an optical path of a light beam passing through a center of the diaphragm and a center of the image plane is deflected by the off-axial reflection surfaces within a surface perpendicular to the long side direction of the region to undergo crossing at least once, wherein all of the off-axial reflection surfaces satisfy a conditional expression:

$$|P|S<0.5$$

where P ($mm^{-1}$) represents an optical power of the off-axial reflection surface within the surface perpendicular to the long side direction and S (mm) represents a distance from the off-axial reflection surface to a subsequent one of the off-axial reflection surfaces along a reference axis.

2. An imaging optical system according to claim 1, wherein the crossing of the optical path is caused on the object surface side from the diaphragm.

3. An imaging optical system for imaging information on an object surface in a region having a length (A) in a long side direction and a length (B) in a short side direction which satisfy a relation of A/B<10, on an image plane, comprising:

a diaphragm;

a first set of a plurality of off-axial reflection surfaces arranged on the object surface side from the diaphragm; and a second set of a plurality of off-axial reflection surfaces arranged on the image plane side from the diaphragm, wherein an optical path of a light beam passing through a center of said diaphragm and a center of the image plane is deflected by the off-axial reflection surfaces within a surface perpendicular to the long side direction of said region to undergo crossing at least once, and, wherein the number (X) of off-axial reflection surfaces included in the first set of the plurality of off-axial reflection surfaces and the number (Y) of off-axial reflection surfaces included in the second set of the plurality of off-axial reflection surfaces satisfy a relation:

$$0.65<X/Y<1.6.$$

4. An imaging optical system according to claim 1, wherein the crossing of the optical path is caused on both the object surface side and the image plane side from the diaphragm.

5. An imaging optical system according to claim 1, wherein optical powers applied by the reflection surfaces of the imaging optical system to the long side direction of the region are all positive.

6. An imaging optical system according to claim 1, wherein an intermediate image is not formed in the optical path.

7. An image reading apparatus comprising:

the imaging optical system according to claim 1; and a line sensor arranged substantially in the image plane position of the imaging optical system and adapted to convert a formed image to an electrical signal.

8. An image reading apparatus comprising:

the imaging optical system according to claim 2; and a line sensor arranged substantially in the image plane position of the imaging optical system and adapted to convert a formed image to an electrical signal.

9. An image reading apparatus comprising:

the imaging optical system according to claim 3; and a line sensor arranged substantially in the image plane position of the imaging optical system and adapted to convert a formed image to an electrical signal.

10. An image reading apparatus comprising:

the imaging optical system according to claim 4; and a line sensor arranged substantially in the image plane position of the imaging optical system and adapted to convert a formed image to an electrical signal.

11. An image reading apparatus comprising:

the imaging optical system according to claim 5; and a line sensor arranged substantially in the image plane position of the imaging optical system and adapted to convert a formed image to an electrical signal.

12. An image reading apparatus comprising:

the imaging optical system according to claim 6; and a line sensor arranged substantially in the image plane position of the imaging optical system and adapted to convert a formed image to an electrical signal.

* * * * *